(No Model.)
W. E. SMITH.
PEDAL FOR BICYCLES.
No. 385,074. Patented June 26, 1888.
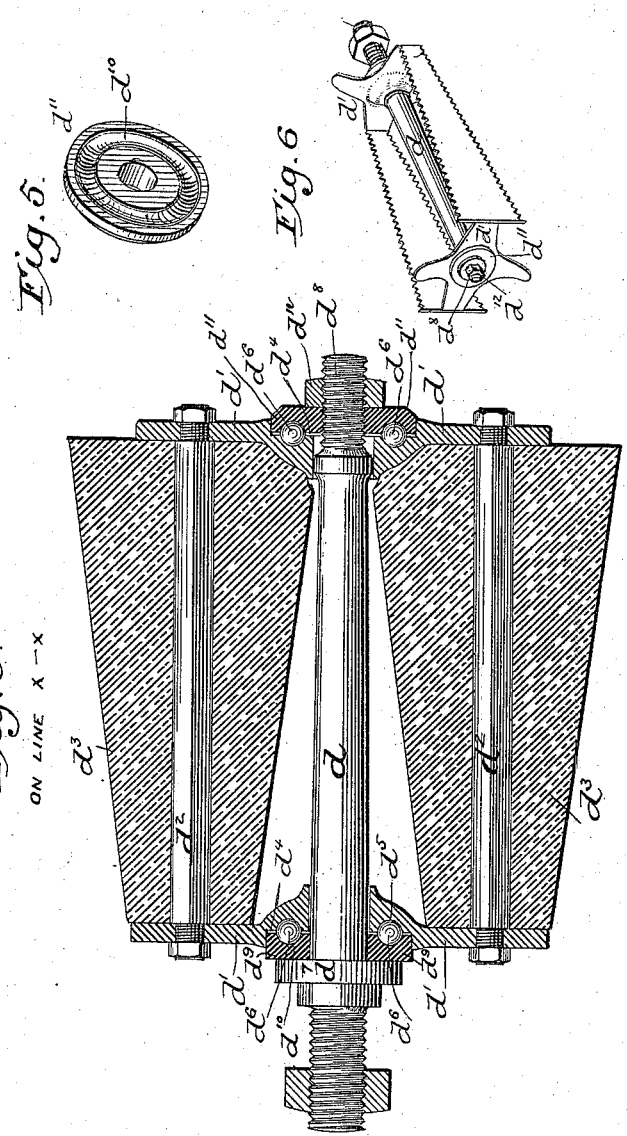
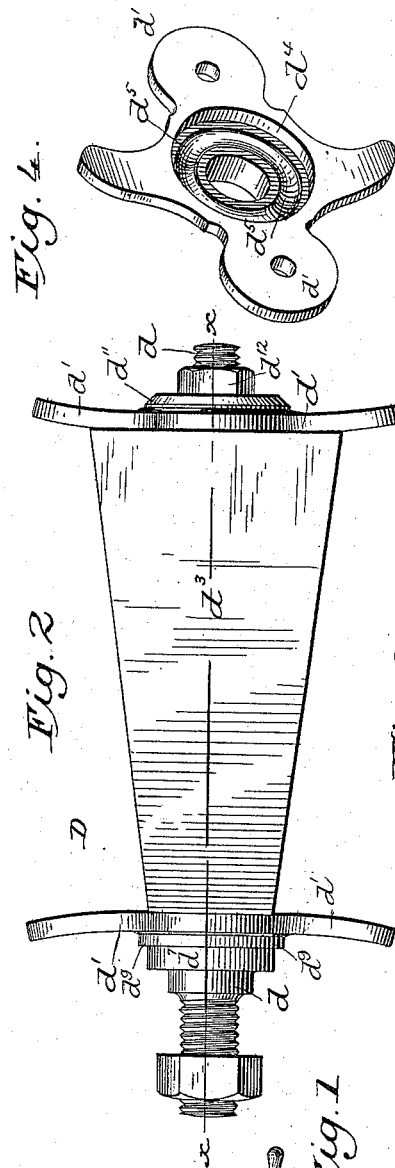
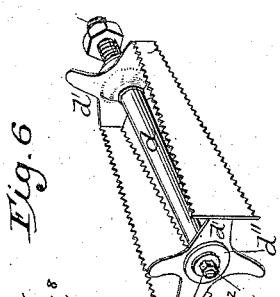
Attest:
Sidney P. Hollingsworth
W. R. Kennedy
Inventor:
W. E. Smith
By his atty
Phil. T. Dodge

UNITED STATES PATENT OFFICE.

WILLIAM E. SMITH, OF WASHINGTON, DISTRICT OF COLUMBIA, ASSIGNOR TO THE SMITH NATIONAL CYCLE MANUFACTURING COMPANY, OF COLORADO.

PEDAL FOR BICYCLES.

SPECIFICATION forming part of Letters Patent No. 385,074, dated June 26, 1888.

Application filed February 28, 1888. Serial No. 265,626. (No model.)

*To all whom it may concern:*

Be it known that I, WILLIAM E. SMITH, of Washington, in the District of Columbia, have invented certain Improvements in Pedals for Bicycles, Tricycles, &c., of which the following is a specification.

This invention relates to that class of pedals which are used upon the cranks and crank-shafts of bicycles, tricycles, and kindred machines; and it consists, first, in the bearing-surfaces for the foot of the rider, which are placed at an inclination from the horizontal, their outer ends being higher than the inner, whereby the rider is enabled to operate them and to retain his feet more firmly in position thereon; and, second, in a peculiar construction and combination of the operative parts which jointly constitute the ball-bearing.

In the accompanying drawings, Figure 1 is a front elevation of an ordinary bicycle provided with my improved pedals. Fig. 2 is an edge view of one of the pedals. Fig. 3 is a horizontal axial section of the pedal on the line $xx$ of Fig. 2. Fig. 4 is a perspective view of one of the end plates. Fig. 5 is a perspective view of one of the circular bearing-plates. Fig. 6 is a perspective view of a skeleton pedal with my invention embodied therein.

Referring to Fig. 1, A represents the ordinary steering and propelling wheel of a bicycle mounted in the lower end of a steering-fork, B, and provided at the ends of its axle with oppositely-projecting cranks C C, carrying at their outer ends the pedals D D. The steering-fork is provided with a steering bar or handle, E, and is swiveled to the front of a reach or backbone, which supports the seat or saddle F directly over the wheel.

The foregoing parts may be, except as to the details of the pedal, of the ordinary construction and arrangement in all respects.

My pedal is of the familiar type, in which a central spindle carries a frame containing on opposite sides of the spindle two bearing-pieces, of rubber or other material, to receive the foot of the rider.

Referring to Figs. 2 and 3, $d$ represents the spindle; $d'$ $d'$, the two end plates loosely encircling the spindle, and rigidly connected by two cross-bars, $d^2$, which are screwed, riveted, or otherwise attached to the plates. Each of the cross-bars $d^2$ is covered or encircled by a foot-piece, $d^3$, of rubber or other suitable material. This foot-piece differs from those in that it is made of tapering form externally, and arranged with its greater diameter at the outer end of the pedal, so that its upper surface is presented, as shown in Fig. 2, in an inclined position. In other words, the upper or bearing surfaces of the parts $d^3$, on which the foot of the rider is placed, have an upward inclination toward their outer ends, instead of presenting horizontal surfaces, as in the pedals now in use. The advantage of this inclination resides in the fact that the upper surface is thus placed at right angles or substantially right angles to the longitudinal axis of the rider's leg, or, in other words, at right angles to lines dropped from the saddle to the top of the pedals.

In the use of the machine the spreading of the rider's feet causes the pressure to be exerted not only in a downward but also in an outward direction—that is to say, in a direction away from the side of the wheel. When, therefore, the machine is in action, there is a constant tendency of the feet to slide toward or from the outer ends of the pedals, and it frequently happens as a consequence that the foot slips from the pedal with serious results to the rider.

Another disadvantage of the pedal having the horizontal upper surface lies in the fact that it compels the foot to play in a very tiresome manner upon the ankle-joint in order to follow the surface of the pedal as the limb rises and falls with the crank. By my construction this difficulty is overcome and the rider enabled to propel the machine with less exertion than heretofore.

While I prefer to employ foot-pieces of rubber, it is to be understood that my improvement, as regards the inclination of the upper surface of the pedal, is applicable to any and all pedals now in use, to those which consist of skeleton metal frames, known as "racing" or "rat-trap," pedals, as well as others.

In Fig. 6 I have illustrated a skeleton pedal with the upper edges of its metal foot-bearings inclined in this manner. The upper inclined surface may be continuous or broken, as preferred, the only requirement being that the surface upon which the foot rests shall be higher at the outer than at the inner end.

Referring, now, to the details of the bearing by which the pedal-frame is supported on the spindle, attention is directed particularly to Figs. 3, 4, and 5, in which it will be seen that each of the end plates, $d'$, is provided, in addition to the central perforation for the passage of the spindle, with a circular recess or cavity, $d^4$, in its outer face. This cavity presents a flat vertical or substantially vertical face containing an annular concentric groove, $d^5$, of a semicircular or substantially semicircular form in cross-section, to receive the series of anti-friction balls $d^6$. The spindle $d$ is made of mild steel or equivalent material, which is free from liability to fracture under sudden strains, and is made of tapering form with a collar or enlargement, $d^7$, at its inner end and a threaded neck, $d^8$, at the outer end. Upon the inner end, against the outer face of the collar $d^7$, I seat a hardened steel ring or bearing-plate, $d^9$, adapted to fit closely but loosely within the recess in the end plate, $d'$, and provided in its inner face with an annular groove, $d^{10}$, to receive the outer sides of the balls. Thus it will be seen that the balls at the inner end of the pedal are confined between the ring $d^9$ and the end plate, $d'$, of the frame, the ring $d^9$ serving to support the balls and the latter in turn serving to carry the end plate. At the outer end of the pedal I secure upon the spindle a hardened steel ring or plate, $d^{11}$, corresponding in form and construction with the plate $d^9$, and adapted to enter the recess in the outer end plate, $d'$, and receive the balls. This outer plate, $d^{11}$, is confined in position by a check-nut, $d^{12}$, screwed upon the spindle behind it. The inner bearing-plate, $d^9$, is commonly secured in place upon the spindle by soft solder, or, in other words, sweated in place upon the spindle, this operation serving to secure the plate firmly in position without destroying its temper and allowing it to be readily removed by the application of a suitable degree of heat.

It will be observed that my construction admits of my employing a spindle of great strength and of a material which prevents it from being fractured in the event of the falling of the machine. It also admits of my using both surfaces of very hard material well adapted to resist the wear, and of a size and form which admit of their being readily and uniformly tempered or hardened. The end plates, $d$, are each stamped complete from steel and their hard wearing-surfaces suitably tempered and hardened.

In order to compensate for wear and keep the bearings tight, it is only necessary to screw the plate $d^{11}$ inward and tighten the nut behind it, the effect being to force the opposing plates at the two ends of the bearing toward each other.

It will be observed that by the employment of the semicircular grooves in the opposing plates I am enabled to sustain the end plates not only by the balls which are for the time being above the spindle, but also by those which are below the spindle, each ball bearing on the bottom of the groove in one plate and in the top of the groove on the opposite plate. In this regard my bearing is much superior to those in which the balls are introduced between male and female cones, so that the entire support is received by the balls which are for the time being at the top of the bearing.

Having thus described my invention, what I claim is—

1. In a bicycle or analogous machine having a seat for the rider and propelling-cranks below the seat and on opposite sides of the seat, pedals applied to said cranks and having top surfaces higher at the outer than at the inner ends, substantially as described and shown.

2. In a pedal for bicycles and kindred machines, the combination of a spindle and a rotary frame mounted thereon and provided with a foot receiving surface higher at the outer than at the inner end.

3. The spindle and the rotary frame, in combination with the two tapering foot-pieces $d$, applied thereto.

4. In a pedal, the soft-metal spindle, in combination with the hardened grooved ring fixed on one end, the hardened grooved plate screwed on the other end, the check-nut, the rotary frame having foot-receiving surfaces, and the grooved end plates, $d$, and the balls seated in the grooves, substantially as described.

5. In a bicycle pedal, the spindle and the circular grooved plates $d^9$ and $d^{11}$, secured thereon, in combination with the pedal-frame having its end plates recessed to fit over and around the edges of plates $d^9$ $d^{11}$ and provided with annular grooves, and the balls seated in the grooves between the plates, as described.

In testimony whereof I hereunto set my hand, this 11th day of February, 1888, in the presence of two attesting witnesses.

WILLIAM E. SMITH.

Witnesses:
F. T. CHAPMAN,
W. R. KENNEDY.